March 1, 1966  G. JOHNSON  3,238,375
PHOTOSENSITIVE APPARATUS FOR DERIVING REGISTRATIONS
BETWEEN RELATIVELY MOVABLE MEMBERS
Filed May 31, 1962  2 Sheets-Sheet 2

INVENTOR
Geoffrey Johnson
BY
Kenyon, Palmer, Stewart &
Estabrook
ATTORNEYS

United States Patent Office 3,238,375
Patented Mar. 1, 1966

3,238,375
PHOTOSENSITIVE APPARATUS FOR DERIVING REGISTRATIONS BETWEEN RELATIVELY MOVABLE MEMBERS
Geoffrey Johnson, Purley, Surrey, England, assignor to Fermat Limited, Purley, Surrey, England, a British company
Filed May 31, 1962, Ser. No. 198,943
Claims priority, application Great Britain, June 5, 1961, 20,301/61
7 Claims. (Cl. 250—219)

The present invention is concerned with the problem of determining when two members are in registration with one another. This problem arises in two dimensions, for example, in correctly locating and aligning optical plates in the synthesis of colour pictures. It also arises in correctly locating and aligning one part of a mechanical press with respect to another part.

According to the invention, there is provided apparatus having two members movable relative to one another and in which a position of registration of the two members is to be determined, wherein a first random pattern is associated with a first of the two members and a second random pattern of identical configuration is associated with the second of the two members, the two members being in registration when the two random patterns are in registration and means being provided to produce a signal when the two random patterns are in registration.

The problem of determining when two members are in registration also arises in one dimension, for example, in machines in which two pointers are to be correctly located with respect to one another. The present invention may be employed to determine when two pointers are in registration with one another and may also be employed to enable the displacement of one pointer with respect to another to be determined by means of a scanner.

For this purpose there may be provided apparatus in which the relative displacement of two members along a given locus is to be determined, comprising a scanner which, in use, is moved so as to repeatedly explore the whole of the locus, means to produce a signal when a random pattern associated with the scanner is in registration with a corresponding random pattern associated with a first of the two members, means to produce a signal when the same or a different random pattern associated with the scanner is in registration with a corresponding random pattern associated with the second of the two members and means for measuring the displacement of the scanner with respect to the first member between registrations of the scanner with the first member and with the second member.

The difficulties previously experienced in a known technique for determining the relative displacement of two members will now be described. The known technique to be discussed is the use of an optical grating to measure the displacement of a scale on one member with respect to the scale of a second member. Such gratings can be employed where the relative motion of the members is limited to one degree of freedom along a prescribed locus and are therefore suitable for the measurement of linear displacement, or alternatively angular displacement.

In the simplest form of this technique the two scales are arranged to move with their faces in close proximity and parallel to each other, and each scale carries an identical regular grating pattern of alternate opaque and transparent bars with accurately known pitch, drawn perpendicular to the direction of motion. A broad collimated light beam is directed through these two patterns, which are in close juxtaposition and in effect superimposed, and is subject to a variable attenuation of brilliance, according to whether the transparent bars on the two scales are in registration or whether the transparent bars on one scale are opposite the opaque bars of the other. Thus, as one scale is displaced with respect to the other, fluctuations in brilliance of the light passing through the two scales can be observed by a photo-electric cell, and can be counted on an electronic or electromechanical counter. The relative displacement of the two scales can be measured by relating the observed count to the known pitch of the bars on the scales.

In this simple form of the technique there is no indication of the "sense" (i.e. direction) of motion along the locus, and various refinements have to be introduced to yield this additional information.

Extremely fine grating lines can be produced on optical scales enabling measurements of great precision to be made and because the gratings are monitored macroscopically by a broad light beam, the effect of small blemishes and imperfections is not serious. For the same reason, in spite of the microscopic dimensions of the grating lines, a large photocell may be employed so that an adequate electrical signal is produced. These features, together with the fact that extremely fast electronic counters are available, make the technique completely practical for engineering use for measurement of length or angle. One drawback to the technique is that after leaving a datum position any counting errors are cumulative because there is no explicit indication of position, but only a recorded total of displacement. Another drawback is that a reversible counter is needed to record both positive and negative displacements and furthermore the counter needs to respond to brightness changes which are arbitrarily slow if the motion is slow, and therefore the connection from the photo-electric cell to the counter needs to be a direct current coupling circuit.

In the apparatus to be described below, an additional motion is superimposed on one scale which will be referred to as the scanning scale, or more briefly the scanner, so that it periodically explores the whole useable locus, and means will be provided to produce a signal when a random pattern on this scanning scale is in registration with a corresponding datum pattern on one member and to produce another signal when a different random pattern on the scanning scale is in registration with a corresponding datum pattern on the other member. By these means the displacement between the two datum marks may be repeatedly or periodically sampled by counting the grating lines between the two registration signals, using the conventional light beam and photocell. Other methods of measuring angular displacement may be employed however.

If, between measuring phases the count is transferred to a store and the counter cleared, then clearly errors in counting are not cumulative. Furthermore if the velocity of the additional scanning motion is higher than the maximum relative velocity of the two members, then the relative velocity of the two scales is always unidirectional, and no direction sensing is needed and a simple non-reversing counter can be used.

An advantage of such an arrangement is that the rate of brightness modulation does not become arbitrarily slow and simple alternating current coupling circuits may be used from the photoelectric cell to the counter.

Registration signals from the random patterns may be obtained in various ways but one method of obtaining them is by directing broad beams of light through identical random patterns through which light transmission is uniformly low until the patterns are in registration at which point a high light level is transmitted. The accuracy of registration achieved by this technique depends mainly upon the dimensions of the marks constituting the patterns and not to a large extent on the dimensions of the beam or photocell, and consequently no difficulty is experienced in optical alignment or sensitivity. In fact this macroscopic monitoring of a fine random pattern yields the same advantages as the macroscopic monitoring of a fine regular grating and it is possible to achieve very fine precision of registration.

This method of registration will be referred to as an autocorrelation method because it uses an approximation to a formal autocorrelation function of the pattern distribution as a criterion of registration. It is a feature of this method that registration can be indicated anywhere along the band of datum marks and the light beam need not move with the moving members.

An apparatus embodying the invention and in which the angular displacement of two members is to be determined will now be described by way of example with reference to the accompanying drawings in which:

FIG. 1b is a side elevation of the apparatus shown in FIG. 1a;

Figure 1A:
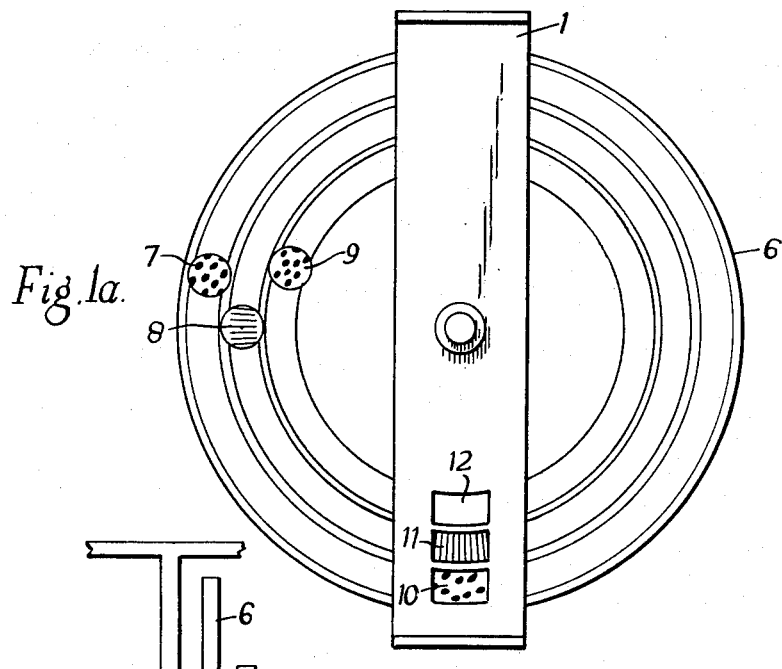
FIG. 1a is a front elevation of an apparatus in which the relative angular displacement of two members around a circular locus is to be determined.
Figure 1B:
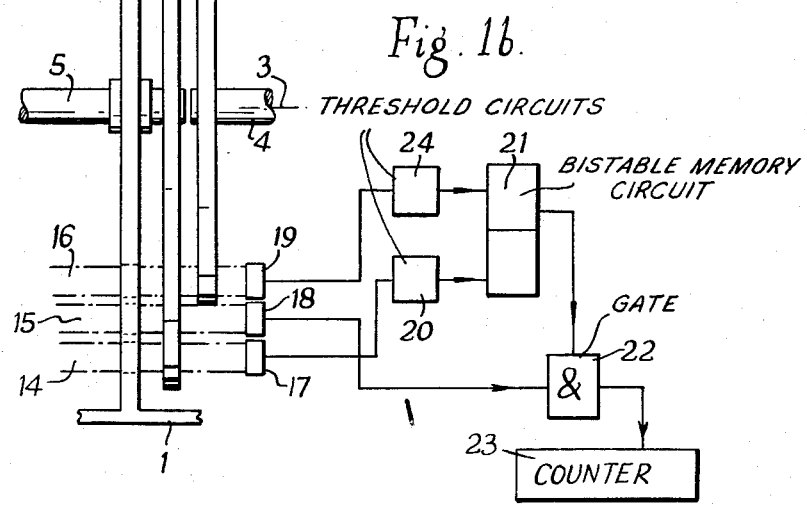

Referring to FIGS. 1a and 1b, the frame 1 of the apparatus constitutes the first of the two members the relative displacement of which is to be determined. A shaft 5 is journalled in the frame 1 and carries a scanning scale 6. A datum scale 2 associated with the second of the two members (not shown) the relative displacement of which is to be determined is mounted on a shaft 4 which is aligned on the same axis 3 as the shaft 5.

In this embodiment, the first member, frame 1, is stationary and only the second member is movable. This degenerate case of one movable member is applicable to many situations.

The second member is free to rotate with the scale 2 in either direction and its angular displacement relative to a prescribed datum setting on the first member, the frame 1, is to be determined.

Figure 1C:
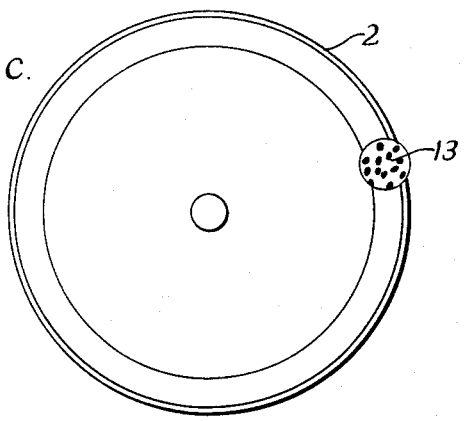
FIG. 1c is a view of one scale of the apparatus.

Scale 6 carries three concentric bands of optical marks 7, 8 and 9, with which are aligned three windows 10, 11 and 12 respectively, in the frame 1. Scale 2 also carries a band of marks 13, as shown in FIG. 1c.

Band 8 is an optical grating pattern of alternate transparent and opaque lines, and will be used in conjunction with an identical section of pattern in window 11 as a means of mensuration of angle in the conventional, known, manner.

Bands 7 and 9 contain random arrays of opaque dots distributed over a transparent background, and in window 10 is a copy of one sector of band 7. Band 13 on scale 2 is a copy of the whole of band 9.

In operation, three collimated light beams 14, 15 and 16 (FIG. 1b) are directed through the windows 10, 11 and 12, and their associated bands on the scales and fall on three photoelectric cells 17, 18 and 19 respectively.

The scale 6 is caused to rotate in one direction with an angular velocity greater than that which can be achieved by scale 2, so that in spite of reversals of direction of motion of scale 2 with respect to the frame 1 there are no such reversals with respect to scale 6.

Beam 15 passes through the grating patterns on window 11 and band 8 and produces displacement flashes on the photocell 18 as the scale 6 rotates. Beam 14 passes through the random patterns on window 10 and band 7 and illuminates the photocell 17. In general, these patterns are not in registration, so that light which is not interrupted by the dots on the window 10 will be interrupted by the dots on the band 7, and the illumination is thus doubly attenuated. There is a particular angular setting of the scale 6 however that produces an identical array of dots on the band 7 in the path of the beam 14 to that already encountered by the beam 14 at the window 10. If this is the case then there is no second attenuation of illumination and a greater signal is obtained from the photocell. This registration signal is detected by a simple threshold circuit, indicated schematically by the block 20 in FIG. 1b, which in turn is made to set a bistable memory circuit 21 and thus open the gate 22 and admit grating pulses from photocell 18 to the counter 23.

Beam 16 passes through the random patterns on band 9 and band 13 and illuminates the photocell 19. In general these patterns are not in registration, but there is a unique angular relationship between the scale 6 and the scale 2 at which they are in registration and the dots in the band 13 fall within the shadow of the dots in band 9. This causes an increased illumination of the photocell 19 and this registration signal is detected by a threshold circuit 24 which, in turn, is made to reset the bistable memory circuit 21 and thus close the gate 22 between the photocell 18 and the counter.

The number so accumulated in the counter 23 is a measure of the angular displacement of the scanning scale 6 between the registration signals, using the grating lines as elements of angle, and is a measure of the "instantaneous" position of the scale 2 relative to the frame 1 at the instant at which the gate 22 was closed.

It may be seen that in general neither scale 6 nor scale 2 is stationary with respect to the beam 16 when registration is being detected, and it is a valuable feature of the present arrangement that the light source and photocell do not need to be moved with either of the two scales.

Figure 2:
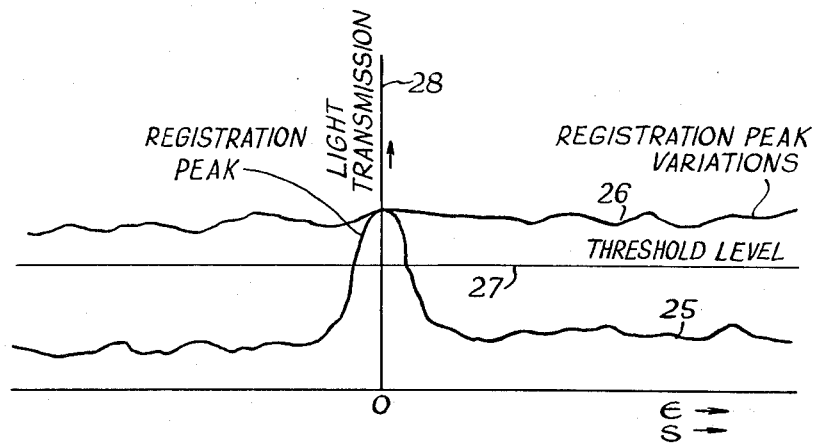
FIG. 2 is a graph showing the autocorrelation signals obtained from the apparatus.

The nature of the registration signal obtained in the apparatus may be more readily understood by reference to FIG. 2 in which 25 is an autocorrelation signal as a function of scale misalignment and 26 is a registration signal of two aligned scales as a function of light beam position.

Defining Y to be the ratio of transmitted light to incident light for a band of random dots and Y(s) to be the continuous transmission function for infinitesimal increments along the path S then $$R(E) = \int_0^S Y(s) \cdot Y(s-E) \, ds$$

is the autocorrelation function of Y(s) referred to displacements E along S.

If two identical bands of dot patterns were misaligned by a distance E and collimated light were incident at all points of the band then the total transmission Y of the superposed patterns is clearly this autocorrelation function R(E) of the pattern. In practice it is only convenient to illuminate a limited area of the band, in which case an approximation to the form of R(E) is obtained. Such a function of E has the form 25 shown in FIG. 2.

As the misalignment E is varied there is a random variation of R(E) as the dots enter and leave the area of the beam. Clearly the greater the ratio of the beam area to the dot area the less effect the individual dot movement has on the total transmission. As the patterns are brought into registration (i.e. no misalignment) the individual dots of one band are superposed on the corresponding dots of the other, and the transmission rises to a peak.

If the two scales are kept in alignment but moved together past the light beams then a high light transmission is maintained but with random variations due to dots entering and leaving the path of the beam. This registration signal level is illustrated by the curve 26 in FIG. 2. Provided there is a level (27) less than any variation in 26 and greater than any random variation in 25 then a simple threshold level can be set to detect the registration peak of 25. This is the criterion by which a necessary area of light beams may be determined. Since the registration peak itself will be contaminated at the skirts by random variations and since the accuracy of threshold detection is improved by setting a high threshold level, it is desirable in practice to use a beam area considerably greater than is necessary according to the above criterion.

Means may be adopted to improve the accuracy of determination of registration over that obtained by a simple threshold circuit. Since the scanning scale is constantly rotating, the transient signal obtained at the edge of the registration peak may be used as a datum mark. Alternatively the registration signal may be differentiated with respect to time and a circuit used to locate not only the peak but the point of zero slope on that peak. A similar result may be achieved without differentiating the registration peak with respect to time by using two registration beams and photocells in conjunction with each dot band, one beam being arranged to produce a registration signal peak at a setting slightly displaced to that of the other. By separately adding and subtracting the two signals a joint peak and a point of zero slope on that peak may be obtained. This system produces a datum signal which is not a function of the speed of the scanner. It is also possible to achieve this result with one non-collimated beam and two photocells.

The registration scales have been described in the above embodiment as random arrays of dots, but a wide variety of random shapes may be used in place of dots. For example, in carrying out one-dimensional registrations, as in the present case of registering two rotatable scales, the bands may be in the form of a grating with bars of random width. In carrying out registration in one or two dimensions, they may be copies of hand-written or typewritten information; they may be copies of soot deposits or paint spray or photographs of star clusters. The simple separation test of the autocorrelation function and the registration function as previously described is a test of the suitability of a particular array.

Instead of being opaque patches on a transparent ground the random pattern may consist of transparent patches on an opaque ground. Further, one of the patterns may be a pattern of patches of light and the other a pattern of translucent patches on an opaque ground.

The lower the transmission ratio of the pattern the lower is the illumination level at the photocell but the higher is the ratio of the registration peak to the mean level off the peak. A thirty percent transmission level for a single pattern is a suitable working figure.

Instead of using two transparent scales it is possible to use one transparent scale and one reflecting scale so that the whole of the optical system is kept on one side of the assembly. An advantage of such an arrangement is that reflecting scales are durable and easy to make.

It is possible to eliminate band 7 by aligning the window 10 and beam 14 with band 9 at a position angularly displaced from the window 12 and beam 16 and interposing a mirror between the scales 6 and 7 to reflect the beam back into the photocell 17 without traversing band 13. Alternatively a flat photocell may actually be accommodated between the scales with no mirror. In this case, the same random pattern on the scanning scale is used to register with both of the members.

Although in the embodiment described the first member, the frame 1, is stationary the invention may be employed in apparatus having movable members. In the case of two movable members however, the results obtained will, unless further measures are taken, only give information about the position of the second member relative to the position occupied by the first member when the scanner registered with it. This may not be a serious drawback, if the first member moves with a much lower velocity than the second.

If in an apparatus having two movable members, the optical system is carried on the first member, then the apparatus is equivalent to the present embodiment, but it is possible to have two movable members and a stationary optical system provided the windows 10, 11 and 12 are large enough to accommodate the fixed beams for the limited range of the movement.

Furthermore, although in the present embodiment the two members and the scales are mounted for rotation, the invention can be used to determine rectilinear displacements. In this case, the scanning scale may be in the form of an endless flexible loop arranged to move in a loop with a constant velocity or it may be periodically moved from its mean position to make a sample measurement. Clearly, in this case, the scanning scale cannot maintain a unique direction of motion with respect to scale 2 during the whole of such a movement, but it must do so between the two registration signals that define the counting period. This may be called the measuring phase and the remainder of the movement called the return phase.

Because the scale 2 and shaft 4 are entirely free of electrical connections, the present technique is particularly suitable for the sampling of the angular setting of low power pointers, such as are found on all kinds of measuring instruments including weighing machines, electric meters, pneumatic and hydraulic pressure and flowmeters.

The technique lends itself readily to use in integrating weighing machines for totalising the weight of material passing along a conveyor. The displacement of the shaft 4 is arranged to represent the weight of material on a section of a conveyor at any instant and the output of the counter 23 is fed into an integrating circuit to give a measure of the total weight of material which has passed along the conveyor.

Reference will now be made to the use of the invention for the registration of two members for purposes other than an aid to mensuration, for example in correctly locating and aligning two parts of a mechanical press with respect to one another. The autocorrelation function 25 in FIG. 2 which is obtained by displacement along a particular locus through the registration position of two scales bearing patterns which are random in all directions is similar to the function obtained by displacement along any other locus in the plane of the scale which passes through the registration position. In other words the curve may be thought of as a section through a solid of revolution about the vertical axis 28. As such it is a criterion of registration for any direction of misalignment, although in the static state it yields no sense information about the direction of misalignment. This shortcoming can be cured by adding a small periodic exploratory motion to one scale, such as a circular two dimensional harmonic virbration, so that it periodically approaches and recedes from the registration position. The sense of misalignment can then be resolved by comparing the phase of the cyclic variations in the registration signal with the phase of the impressed vibration. Circuits for finding the peaks of response curves by impressed perturbations and phase conscious discriminators are well known in the art of radar and automatic tuning controls.

Registration methods of this sort may be applied to the alignment of optical plates in the synthesis of colour pictures.

They may also be used in positional error detectors in follow-up servo systems having the advantage that the detector system remains stationary although the servo system is moving.

Another example of the use of a registration method of the present kind is in the correct location of a map on a radar screen on which a scan of an area of country is being projected. A random pattern of translucent patches is formed on a part of the material on which the map is printed, the remainder of this material being opaque. This part of the map material is located over a part of the radar screen on which is produced a random pattern of patches of light corresponding to a section of the pattern of translucent patches on the map. This random pattern is altered according to the area of country being scanned by the radar installation so as to correspond to the random pattern of translucent patches on the associated part of the map. The light transmitted through the translucent patches is allowed to fall on a photocell the output of which is fed to control systems and servo mechanisms which move the map to maintain the correct section of it over the radar screen.

I claim:
1. In an apparatus having first and second members movable relative to one another, means for determining a position of registration of the first and second members, comprising:
   said members;
   a first pattern support member associated with said first member and marked with a first random pattern including a non-periodic multiplicity of randomly disposed patches having a first transmission factor to radiation on a ground having a second transmission factor to said radiation;
   a second pattern support member associated with said second member and marked with a second identical pattern of patches on a ground;
   said first and second members being adapted for relative movement so as to bring about a registration of said first and second random patterns;
   means for directing a macroscopic beam of said radiation through said random patterns;
   and means for detecting radiation transmitted through said random patterns and for determining when the transmitted radiation reaches a peak value indicating a position of exact registration between the said two random patterns.

2. Apparatus according to claim 1, wherein said patches having a first transmission factor are opaque patches on a transparent ground.

3. Apparatus according to claim 1, wherein said patches having a first transmission factor are transparent patches on an opaque ground.

4. In an apparatus having first and second members movable relative to one another, means for determining a position of registration of the first and second members, comprising:
   said members;
   a first pattern support member associated with said first member and marked with a first random pattern including a non-periodic multiplicity of randomly disposed patches transparent to radiation on an opaque ground;
   a second pattern support member associated with said second member and marked with a second random pattern including a multiplicity of randomly disposed radiation-emitting patches exactly congruent with the transparent patches in said first random pattern;
   said first and second members being adapted for relative movement so as to bring about a registration of said first and second random patterns;
   and means for detecting radiation transmitted through said transparent patches of said first random pattern from said radiation-emitting patches of said second random pattern and for determining when said radiation reaches a peak value indicating a position of exact registration between the said two random patterns.

5. Apparatus of the type in which the relative displacement of movable first and second members along a given locus is to be determined by moving a scanner member along the locus into registration with each of the two members in turn, said apparatus comprising:
   said members;
   a first pattern support member associated with said first member and marked with a first random pattern including a non-periodic multiplicity of randomly disposed patches having a first transmission factor to radiation on a ground having a second transmission factor to said radiation;
   a second pattern support member associated with said second member and marked with a second identical pattern of patches on a ground;
   a scanner member;
   a third pattern support member associated with said scanner member and marked with a third identical pattern of patches on a ground;
   means for moving said scanner member so as to repeatedly explore said locus and bring said third pattern support member into registration with said first and second pattern support members in turn;
   means for directing a macroscopic beam of radiation through said first and third random patterns and through said second and third random patterns;
   means for detecting radiation transmitted through said patterns and for determining a radiation peak indicating an exact registration between said first and third patterns and said second and third patterns;
   and means for measuring the displacement of said scanner member along the locus between said registrations.

6. Apparatus in which the relative displacement of movable first and second members along a given locus is to be determined by moving a scanner member along the locus into registration with each of the two members in turn, said apparatus comprising:
   said members;
   a first pattern support member associated with said first member and marked with a first random pattern including a non-periodic multiplicity of randomly disposed patches having a first transmission factor to radiation on a ground having a second transmission factor to said radiation;
   a second pattern support member associated with said second member and marked with a second random pattern including a non-periodic multiplicity of randomly disposed patches having a first transmission factor to radiation on a ground having a second transmission factor to said radiation;
   a scanner member;
   a third pattern support member associated with said scanner member and marked with a third random pattern of patches on a ground, identical with said second random pattern;
   a fourth pattern support member associated with said scanner member and marked with a fourth random pattern of patches on a ground, identical with said second random pattern;
   means for moving said scanner member so as to repeatedly explore the locus and bring said third and fourth pattern support members into registration with said first and second pattern support members respectively;
   means for directing a macroscopic beam of radiation through said first and third random patterns and through said second and fourth random patterns;
   means for detecting radiation transmitted through said patterns and for determining radiation peaks indicating an exact registration between said first and third random patterns and between said second and fourth random patterns;
   and means for measuring the displacement of said scanner member along the locus between said registrations.

7. In an apparatus having first and second members which are both movable along parallel loci, means for determining a portion of registration of the members, comprising
   said members;
   first and second pattern support members associated with said first and second members respectively and marked with first and second identical random patterns of multiplicities of randomly disposed patches having a first transmission factor to radiation on a ground having a second transmission factor to said radiation;

fixed means for directing a macroscopic beam of said radiation through said random patterns in one region only of said loci, said region including many patches of each pattern;

an means for detecting radiation transmitted through said random patterns and for determining when the transmitted radiation reaches a peak value indicating a position of exact registration between the said two random patterns.

References Cited by the Examiner

UNITED STATES PATENTS

| | | | |
|---|---|---|---|
| 2,349,687 | 5/1944 | Williams | 250—233 X |
| 2,363,416 | 11/1944 | Henroteau | 250—233 X |
| 2,603,123 | 7/1952 | Loukomsky et al. | 250—233 X |
| 2,680,241 | 6/1954 | Gridley | 340—271 |
| 2,788,519 | 4/1957 | Caldwell | 250—233 X |
| 2,790,088 | 4/1957 | Shive | 250—219 |
| 2,795,705 | 6/1957 | Rabinow | 250—233 X |
| 2,944,157 | 7/1960 | McAuslan et al. | 250—233 |
| 2,970,302 | 1/1961 | Gridley | 340—271 |
| 3,076,374 | 2/1963 | De Neergaard | 250—231 X |
| 3,130,305 | 4/1964 | Sutherland | 250—219 |

RALPH G. NILSON, *Primary Examiner.*

ARCHIE BORCHLET, *Examiner.*